US012691461B2

(12) United States Patent
Leshem

(10) Patent No.: US 12,691,461 B2

(45) Date of Patent: Jul. 28, 2026

(54) PRODUCT DISPENSER

(71) Applicant: ICG BUSINESS VENTURES LTD, Rishon Lezion (IL)

(72) Inventor: Adoram Leshem, Rishon Lezion (IL)

(73) Assignee: ICG BUSINESS VENTURES LTD, Rishon Lezion (IL)

( * ) Notice: Subject to any disclaimer, the term of this patent is extended or adjusted under 35 U.S.C. 154(b) by 0 days.

(21) Appl. No.: 19/479,807

(22) PCT Filed: Apr. 18, 2024

(86) PCT No.: PCT/IL2024/050388

§ 371 (c)(1),
(2) Date: Oct. 29, 2025

(87) PCT Pub. No.: WO2024/228185

PCT Pub. Date: Nov. 7, 2024

(65) Prior Publication Data

US 2026/0138143 A1 May 21, 2026

(51) Int. Cl.

*B65D 47/04* (2006.01)
*B05B 11/00* (2023.01)
*B67C 11/06* (2006.01)

(52) U.S. Cl.

CPC .......... *B05B 11/0097* (2013.01); *B65D 47/04* (2013.01); *B67C 11/06* (2013.01)

(58) Field of Classification Search

CPC ...... B05B 11/0097; B65D 47/04; B67C 11/06
See application file for complete search history.

(56) References Cited

U.S. PATENT DOCUMENTS 3,559,701 A * 2/1971 Wittersheim .......... B65D 83/42
141/303
3,620,266 A * 11/1971 Ryder .................. B65B 31/003
417/547

(Continued)

FOREIGN PATENT DOCUMENTS

CN 201055827 Y 5/2008
CN 201329329 Y 10/2009

(Continued)

OTHER PUBLICATIONS

International Search Report and Written Opinion issued Oct. 25, 2024 in International Application No. PCT/IL2024/050388.

(Continued)

*Primary Examiner* — Nicolas A Arnett

(74) *Attorney, Agent, or Firm* — Panitch Schwarze Belisario & Nadel LLP

(57) ABSTRACT

A product dispenser refillable from a donor container, the product dispenser including a housing for receiving and storing liquid product, a dispensing module including a dispenser mechanism for dispensing liquid product from the product dispenser, and a refilling module including a funnel through which liquid product is filled into the housing from the donor container; and a refilling module cap including a plug for secure mounting on the funnel and dismounting therefrom for corresponding sealing the funnel and enabling the housing to be filled with liquid product from the donor container. Abdominal biofeedback apparatus including a biofeedback device having a rigid strap ring and a reciprocal strap ring, and a strap having two opposite free strap ends each having a securing device for securing on the rigid strap ring and the reciprocal strap ring for enabling removal of the strap from the biofeedback device.

5 Claims, 10 Drawing Sheets

(56) References Cited

U.S. PATENT DOCUMENTS

| | | | | | |
|---|---|---|---|---|---|
| 3,680,605 | A * | 8/1972 | Nigro | B65D 83/20 | 222/536 |
| 4,313,477 | A * | 2/1982 | Sebalos | B65D 83/62 | 141/301 |
| 4,836,253 | A * | 6/1989 | Nye | B65B 3/10 | 141/59 |
| 7,431,222 | B2 * | 10/2008 | Monterrosa | B65D 83/30 | 239/518 |
| 7,686,190 | B2 * | 3/2010 | Patrick | B65D 83/303 | 222/402.11 |
| 8,002,001 | B2 * | 8/2011 | Leshem | B65D 83/303 | 141/3 |
| 10,845,260 | B2 * | 11/2020 | Robertson | G01L 5/047 | |
| 2004/0084095 | A1 | 5/2004 | Knowles | | |
| 2004/0139965 | A1 | 7/2004 | Greenleaf et al. | | |
| 2005/0056343 | A1 * | 3/2005 | Gueret | A45D 40/262 | 141/349 |
| 2005/0170938 | A1 * | 8/2005 | Parise | A63B 21/4009 | 482/112 |
| 2008/0066825 | A1 | 3/2008 | Leshem | | |
| 2012/0312843 | A1 | 12/2012 | Dumont et al. | | |
| 2013/0019991 | A1 | 1/2013 | Muller | | |
| 2017/0028419 | A1 * | 2/2017 | Vecchione | B05B 11/047 | |

FOREIGN PATENT DOCUMENTS

| | | | |
|---|---|---|---|
| CN | 220308611 | U | 1/2024 |
| JP | 2005343559 | A | 12/2005 |
| KR | 101523846 | B1 | 5/2015 |
| KR | 101795215 | B1 | 11/2017 |
| WO | 2006129322 | A1 | 12/2006 |
| WO | 2015004290 | A1 | 1/2015 |

OTHER PUBLICATIONS

Office Action and Serarch Report issued Feb. 27, 2026 in CN 202480028263.5.

* cited by examiner

PRODUCT DISPENSER

CROSS-REFERENCE TO RELATED APPLICATIONS

This application is a Section 371 of International Application No PCT/IL2024/050388, filed Apr. 18, 2024, which was published in the English language on Nov. 7, 2024, under International Publication No. WO 2024/228185 A1, which claims priority under 35 U.S.C. § 119(b) to Israeli Application No. 302515, filed Apr. 30, 2023, the disclosures of each of which are incorporated herein by reference.

FIELD OF THE INVENTION

The invention relates to a product dispenser and abdominal biofeedback apparatus.

BACKGROUND OF THE INVENTION

Product dispensers refillable from a donor container containing liquid product and including a dispenser for dispensing liquid product are described inter alia in U.S. Pat. No. 3,559,701 to Wittersheim et al., U.S. Pat. No. 3,620,266 to Ryder, U.S. Pat. No. 4,836,253 to Nye, U.S. Pat. No. 7,431,222 to Monterrosa, U.S. Pat. No. 7,686,190 to Patrick, and U.S. Pat. No. 8,002,001 to Leshem.

Abdominal biofeedback apparatus is described inter alia in KR101795215, KR101523846, U.S. Pat. No. 10,845,260 to Robertson et al and US Patent Application Publication 2005/0170938 to Parise.

SUMMARY OF THE INVENTION

One aspect of the present invention is directed towards product dispensers refillable from a donor container including a dispenser for dispensing liquid product. The product dispensers include a housing having a housing centerline and configured for receiving and storing liquid product. The housings include a dispensing module and a refilling module spaced apart therefrom. The dispensing module has a dispenser mechanism for dispensing liquid product from the product dispenser. The refilling module has a funnel through which liquid product is refilled into the housing from the donor container. The product dispensers include a refilling module cap for secured mounting on a refilling module and dismounting therefrom for corresponding sealing a funnel and enabling a housing to be refilled with liquid product from a donor container. The funnels are designed to facilitate ergonomical repeated refilling of products dispensers from different types and sizes of donor containers, and different types of dispenser mechanisms.

Another aspect of the present invention is directed towards abdominal biofeedback apparatus for issuing user alerts on detecting instances a user relaxes his abdominal muscles after he has comfortably tensed his abdominal muscles and snugly strapped the abdominal biofeedback apparatus around his waist. The abdominal biofeedback apparatus includes a biofeedback device having a rigid strap ring and a reciprocal strap ring on opposite sides and a strap having two opposite free strap ends each having a securing device for securing on the biofeedback device's rigid strap ring and reciprocal strap ring such that the strap can be removed from the biofeedback device. A user straps the abdominal biofeedback apparatus around his waist such that the biofeedback device is at his waist's front, back or one of its sides. The securing devices are adjacent to the biofeedback device such that, depending on the securing devices, a user can use a single securing device or both securing devices to conveniently adjust the strap's length between the rigid strap ring and the reciprocal strap ring during continuous wearing of the abdominal biofeedback apparatus. The reciprocal strap ring is biased in a retracted position and selectively linearly slidingly displaceable towards an extended position away from the biofeedback device on relaxation of a user's abdominal muscles. The biofeedback device includes a controller for issuing a user alert on detection of a linear sliding displacement of the reciprocal strap ring from its retracted position greater than a predetermined minimum displacement. The abdominal biofeedback apparatus assists users to strengthen their abdominal and core muscles to improve wellbeing, posture, and the like.

BRIEF DESCRIPTION OF DRAWINGS

In order to understand the invention and to see how it can be carried out in practice, preferred embodiments will now be described, by way of non-limiting examples only, with reference to the accompanying drawings in which similar parts are likewise numbered, and in which.

DETAILED DESCRIPTION OF DRAWINGS

Figure 3:
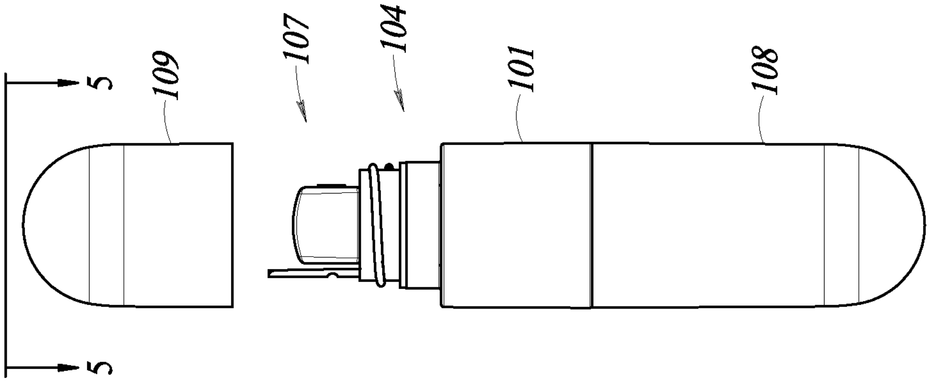
FIG. 3 (PRIOR ART)
FIG. 3 is a front elevation view of an inverted FIG. 1 product dispenser with its refilling module cap removed to show its funnel.
Figure 2:
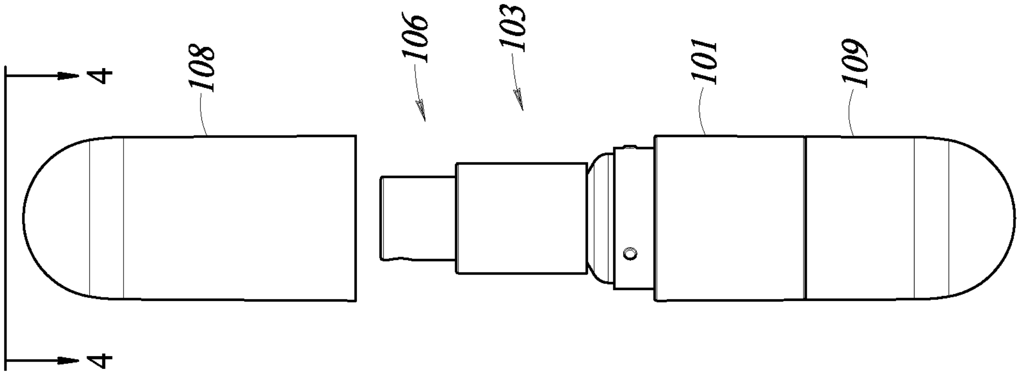
FIG. 2 (PRIOR ART)
FIG. 2 is a front elevation view of the FIG. 1 product dispenser with its dispensing module cap removed to show its dispenser mechanism.
Figure 1:
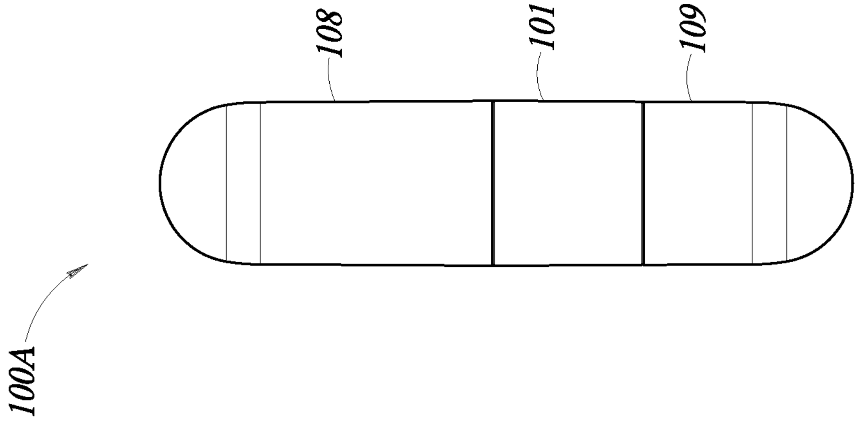
FIG. 1 (PRIOR ART)
FIG. 1 is a front elevation view of a conventional product dispenser.
Figure 4:
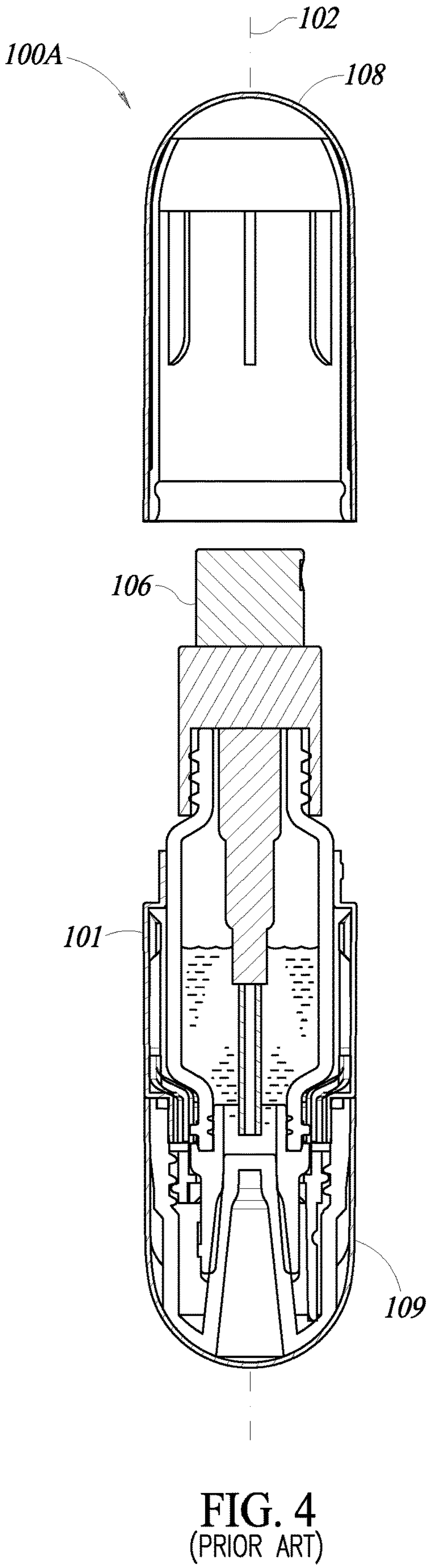
FIG. 4 (PRIOR ART)
FIG. 4 is a longitudinal section of the FIG. 1 product dispenser along FIG. 2's line 4-4.
Figure 5:
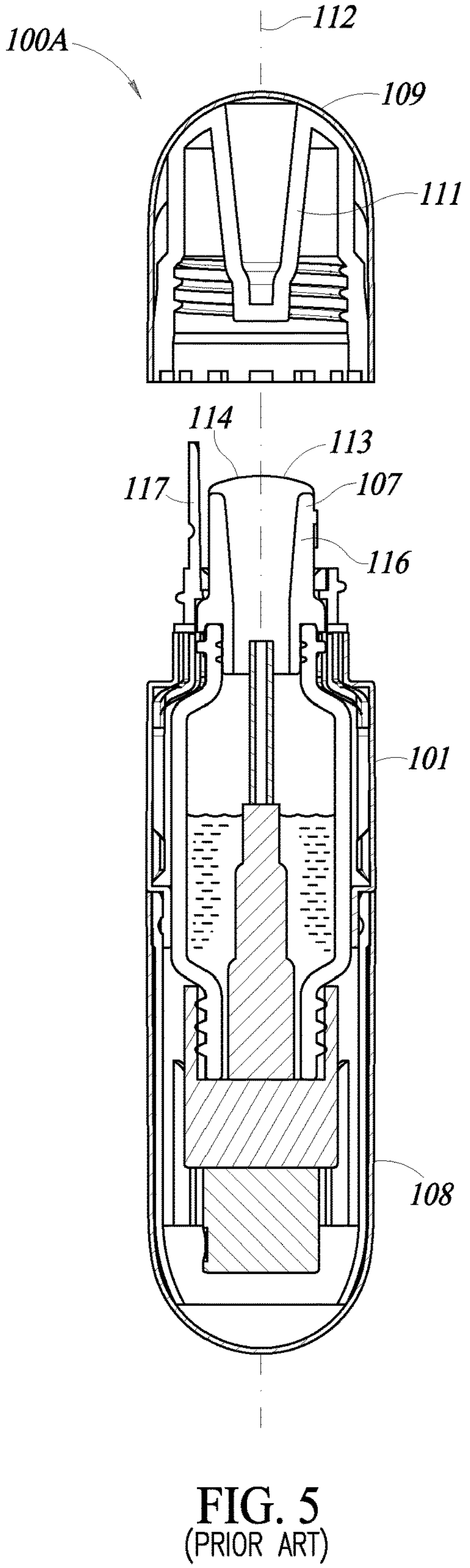
FIG. 5 (PRIOR ART)
FIG. 5 is a longitudinal section of the FIG. 1 product dispenser along FIG. 3's line 5-5.
Figure 6:
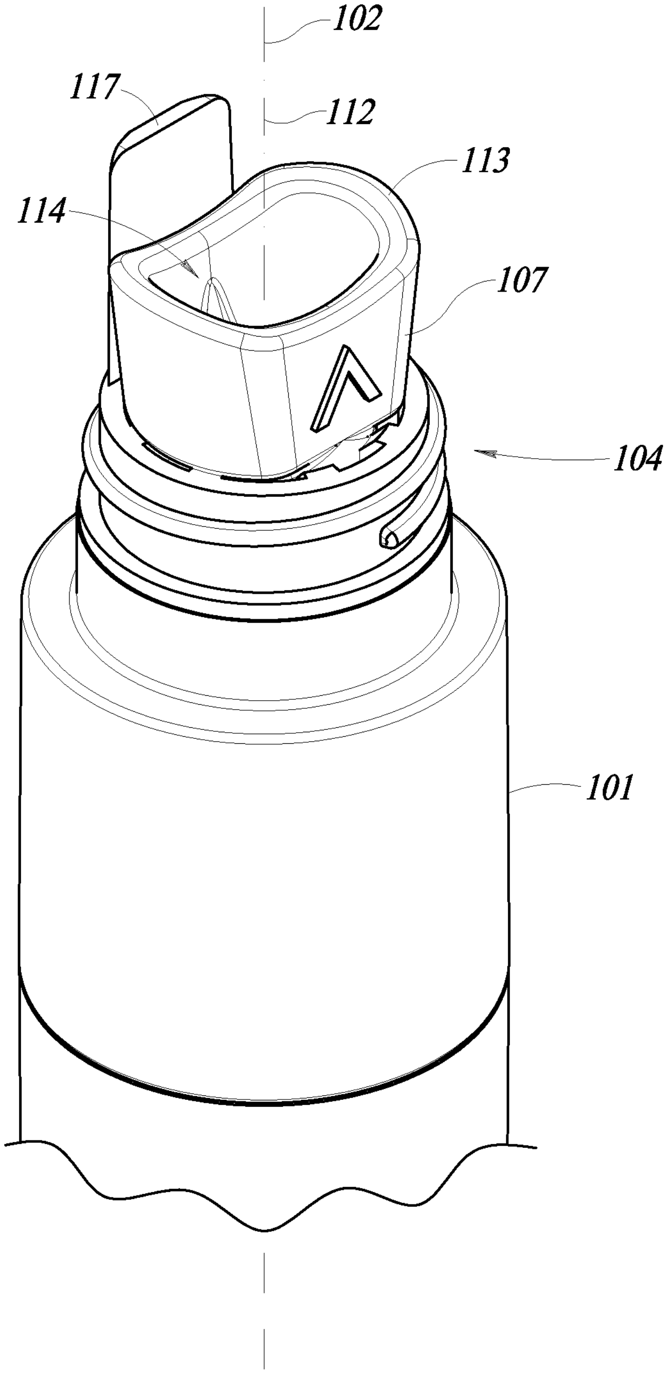
FIG. 6 (PRIOR ART)
FIG. 6 is a closeup view of the FIG. 1 product dispenser's funnel.

The present description includes three sections:
Section 1: Conventional Product Dispenser
Section 2: Product Dispenser
Section 3: Abdominal BioFeedback Apparatus

Section 1: Conventional Product Dispenser

FIG. 1 to FIG. 7 show an exemplary product dispenser 100A refillable from a donor container 200 containing liquid product 201 and including a dispenser 202 for dispensing liquid product 201. The dispenser 202 can include a pour opening or dispensing by squeezing the donor container 200, a spray mechanism, a roll mechanism, and the like. The product dispenser 100A can have a wide range of different shapes and sizes. Some product dispensers 100A have symmetrical shapes, for example, a generally cylindrical shape, a generally cuboid shape, and the like. Other product dispensers 100A have asymmetrical shapes. The product dispensers 100A includes a housing 101 having a housing centerline 102 and configured for receiving and storing liquid product 201.

The housing 101 has a dispensing module 103 and a refilling module 104 spaced apart from the dispensing module 103. Depending on a housing 101's shape, the dispensing module 103 and the refilling module 104 can be spaced apart heightwise or widthwise. The dispensing module 103 includes a dispenser mechanism 106 for dispensing liquid product, the dispenser mechanism 106 being constituted by a pour opening or dispensing by squeezing the product dispenser 100A, a roll mechanism, a spray mechanism, and the like. The refilling module 104 includes a funnel 107 through which liquid product is filled into the housing 101. The product dispenser 100A includes a dispensing module cap 108 for secured mounting on the dispensing module 103. The dispensing module cap 108 preferably includes friction members for friction fitting on the dispensing module 103. The product dispenser 100A includes a refilling module cap 109 for secured mounting on the refilling module 104 and dismounting therefrom for corresponding sealing the funnel 107 and enabling the housing 101 to be filled with liquid product 201. The refilling module cap 109 includes a plug 111 for sliding insertion into and removal from the funnel 107. The refilling module cap 109 includes a screw thread arrangement for ensuring a sealing engagement on the refilling module 104.

The funnel 107 has a funnel centerline 112 and a funnel rim 113 bounding a funnel opening 114. The funnel centerline 112 is co-linear with the housing centerline 102. The funnel 107 has a slightly diverging funnel side wall 116 leading to the funnel rim 113. The funnel side wall 116 has near uniform thickness along its length. The refilling module 104 includes a flexible forefinger support 117 spaced apart from the funnel 107 and adjacent thereto for supporting a user's forefinger during a repeated depressing action on a donor container's spray dispenser. The funnel 107 is manufactured from resiliently compressible silicone such that the funnel 107 is only slightly compressible on depression of a donor container's spray dispenser thereagainst.

Figure 7:
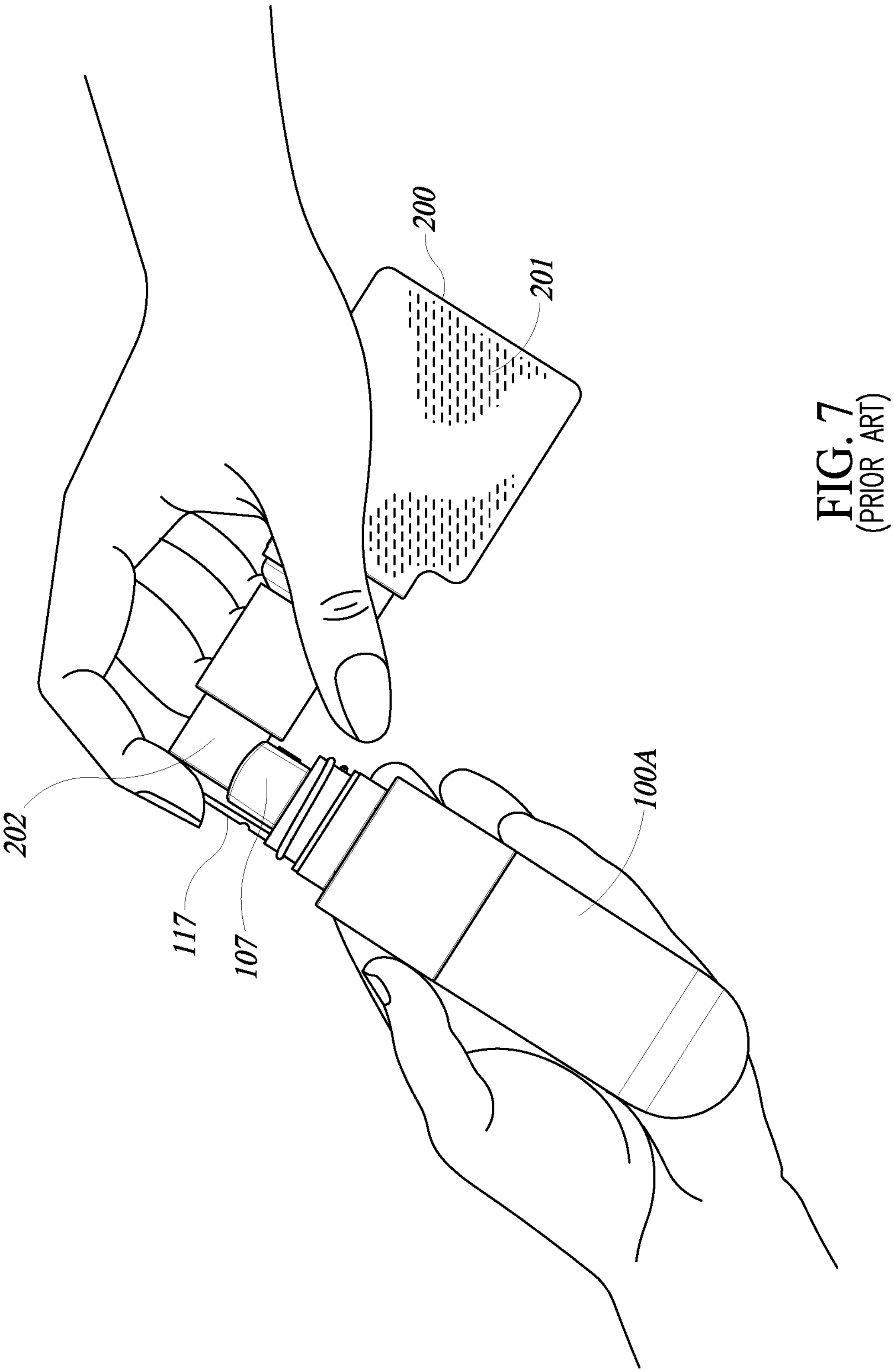
FIG. 7 (PRIOR ART)
FIG. 7 is a schematic view showing refilling of the FIG. 1 product dispenser with liquid product from a donor container having a spray dispenser.

FIG. 7 shows that in the case of a donor container 200 having a spray dispenser constituting a dispenser 202, a user inverts the product dispenser 100A and removes the refilling module cap 109 to expose the funnel 107. A righthand user typically holds the inverted product dispenser 100A in his left hand and holds a donor container 200 in his right hand such that the product dispenser 100A and the donor container 200 accurately subtend a right angle therebetween and forcibly urges the donor container's spray dispenser 202 against the product dispenser's funnel rim 113 to prevent spillage of liquid product during refilling. Thereupon, the user places his forefinger on the forefinger support 117 and repeatedly depresses the donor container's spray dispenser 202 for transferring liquid product to the product dispenser 100A. After refilling the product dispenser 100A, the user replaces the refilling module cap 109 on the refilling module 104 to insert the plug 111 into the funnel 107 before uprighting the product dispenser 100A and removing the dispensing module cap 108 ready for dispensing liquid product.

Section 2: Product Dispenser

Figure 10:
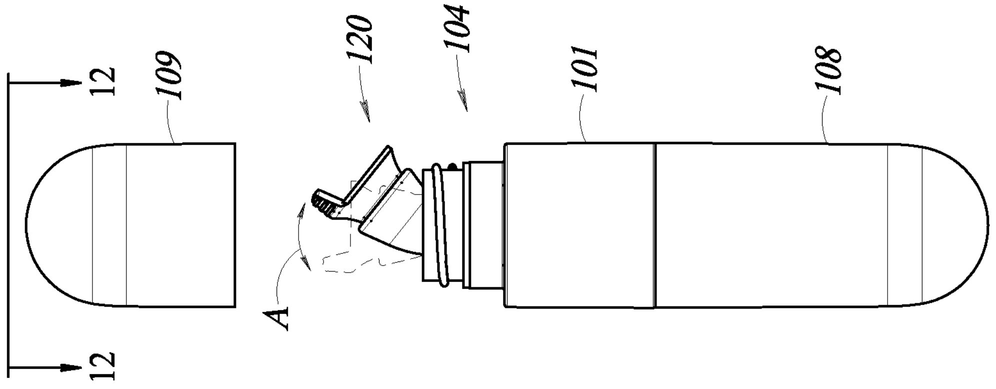
FIG. 10 is a front elevation view of an inverted FIG. 8 product dispenser with its refilling module cap removed to show its funnel.
Figure 9:
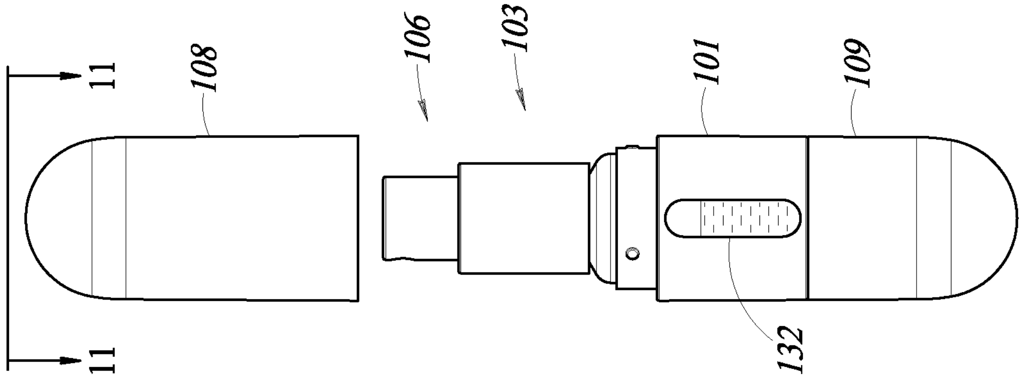
FIG. 9 is a front elevation view of the FIG. 8 product dispenser with its dispensing module cap removed to show its dispenser mechanism.
Figure 8:
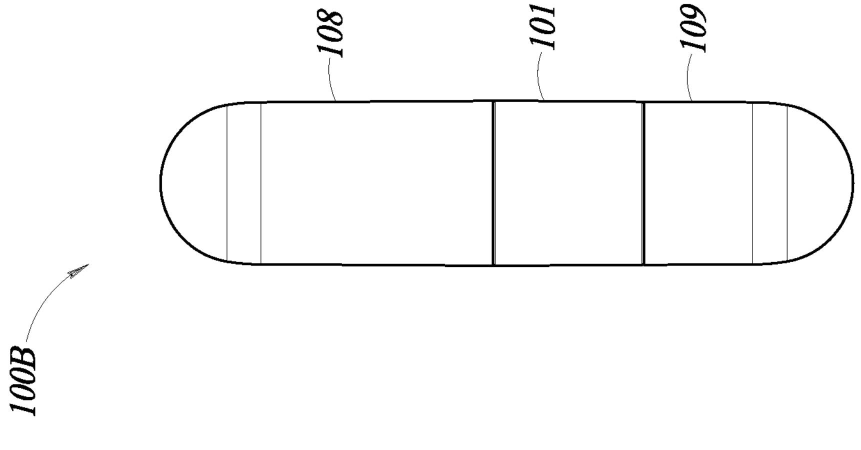
FIG. 8 is a front elevation view of a product dispenser in accordance with one aspect of the present invention.
Figure 11:
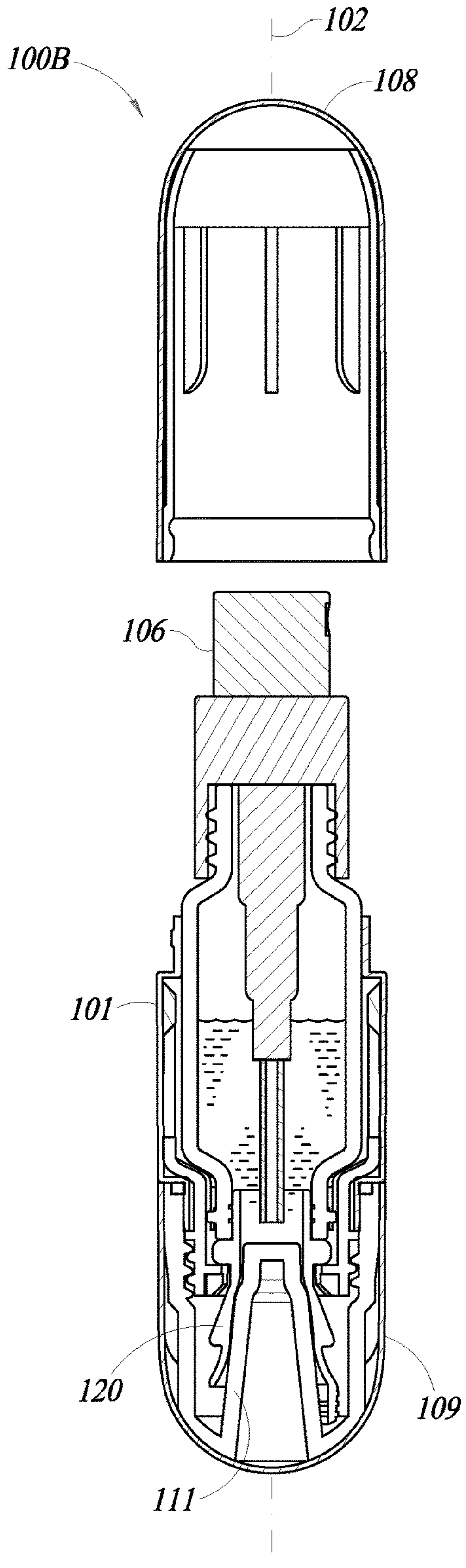
FIG. 11 is a longitudinal section of the FIG. 8 product dispenser along FIG. 9's line 11-11.
Figure 12:
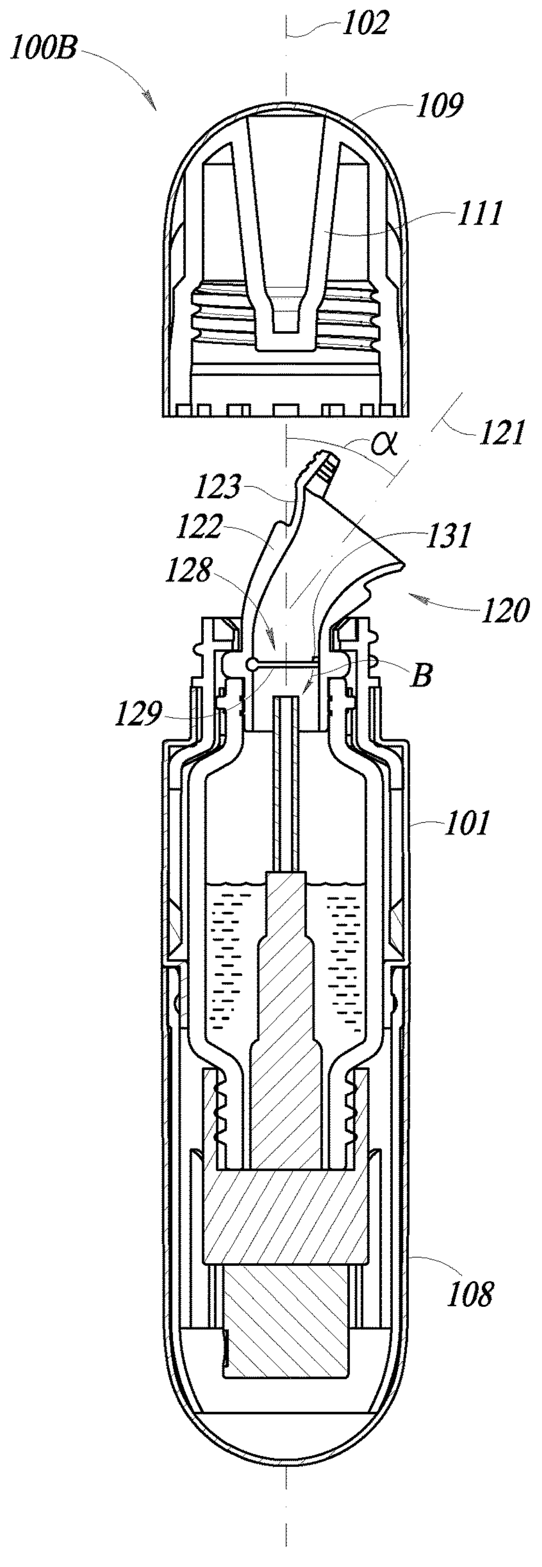
FIG. 12 is a longitudinal section of the FIG. 8 product dispenser along FIG. 10's line 12-12.
Figure 13:
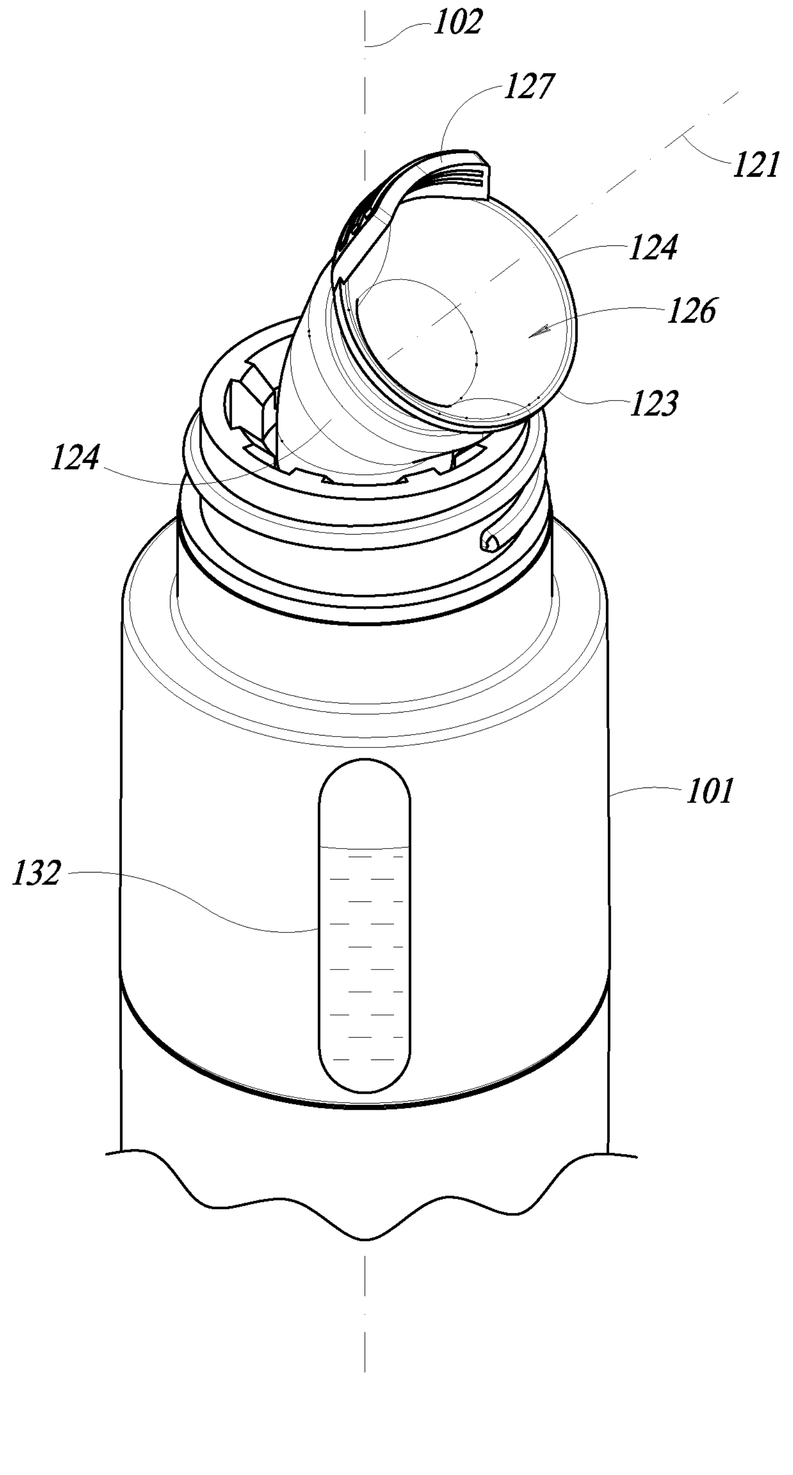
FIG. 13 is a closeup view of the FIG. 8 product dispenser's funnel.

FIG. 8 to FIG. 14 show a product dispenser 100B having a similar construction as the product dispenser 100A and therefore similar parts are likewise numbered except for the product dispenser 100B's funnel. On inverting the product dispenser 100B and removing the refilling module cap 109 from the refilling module 104, the product dispenser 100B includes a funnel 120 having an unflexed arcuate orientation away from the housing centerline 102. The funnel 120 is made from pliable plastic material, for example, silicone, and the like, which is intended for repeated reciprocation between the unflexed arcuate orientation away from the housing centerline 102 and a flexed orientation generally co-directional therewith. FIG. 10 shows the unflexed arcuate orientation in a solid line, the flexed orientation in a dashed line, and the reciprocation therebetween denoted by arrow A. FIG. 12 shows the funnel 120 has a funnel centerline 121 which in its unflexed arcuate orientation away the housing centerline 102 subtends an acute angle $\alpha$, say, in the range of $40° \pm 10°$.

The funnel 120 has a stepped construction including a trailing major funnel section 122 and a leading minor funnel section 123 having a funnel rim 124. The leading minor funnel section 123 has a considerably reduced thickness compared to the trailing major funnel section 122 for facilitating intimate sealing contact with a donor container's dispenser 202. The leading minor funnel section 123 preferably has a flared funnel opening 126 having a greater area than the product dispenser 100A's funnel opening 114. The funnel rim 124 includes a forefinger support protrusion 127 for supporting a user's forefinger during refilling the product dispenser 100B. Alternatively, the funnel 120 can have uniform thickness therealong.

The funnel 120 can include a one-way valve 128 for enabling refilling and preventing spillage of liquid contents in the case a user omits to replace the refilling module cap 109 before inverting the product dispenser 100B. The one-way valve 128 includes a pivotable leaf member 129 and a stopper 131. Refilling liquid product causes the leaf member 129 to swing open as denoted by arrow B. The stopper 131 seals the funnel 120 in the case a user omits to replace the refilling module cap 109 before inverting the product dispenser 100B.

The housing 101 optionally includes a window 132 for viewing its stored volume of liquid product.

Figure 14:
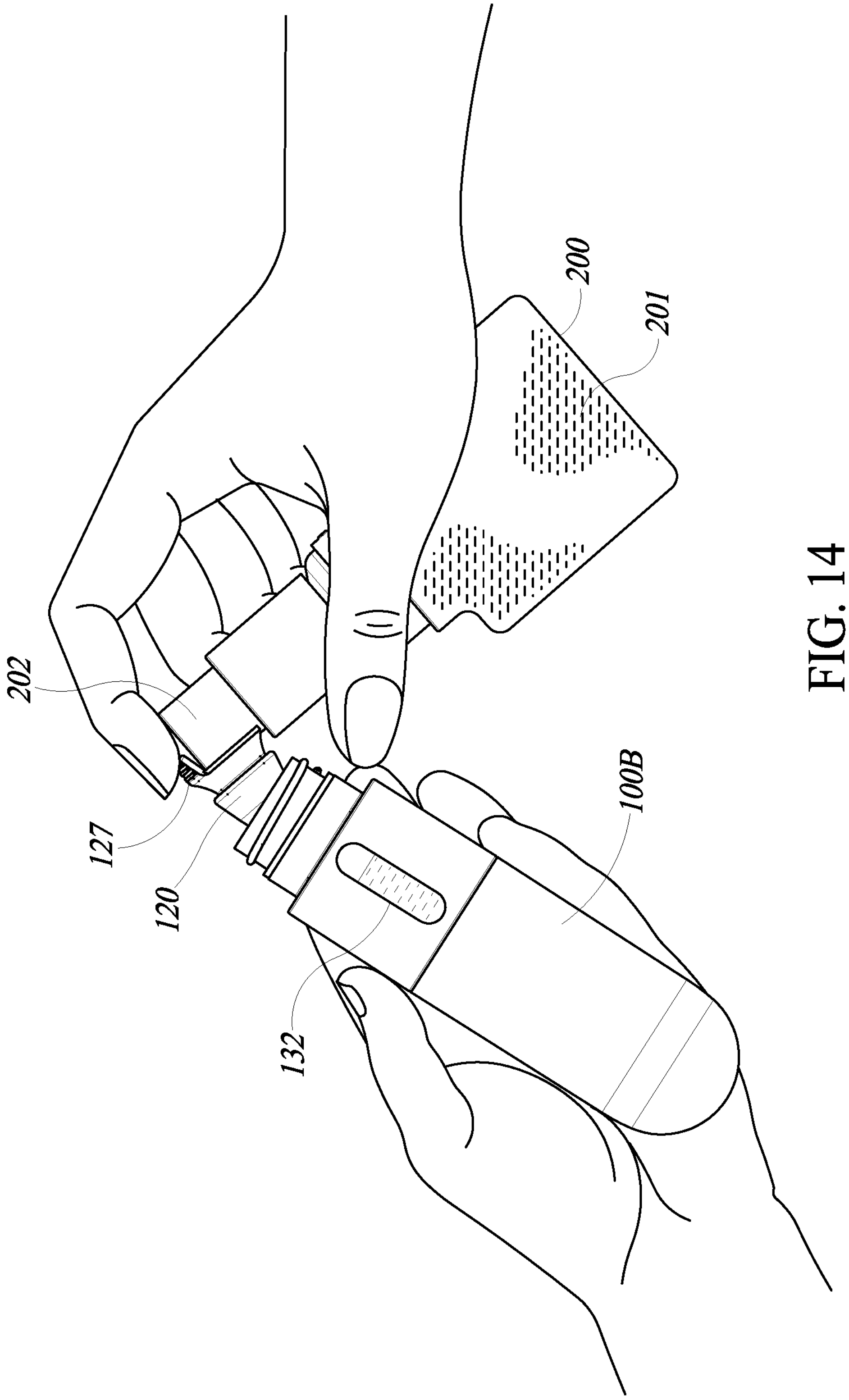
FIG. 14 is a schematic view showing refilling of the FIG. 8 product dispenser with liquid product from a donor container having a spray dispenser.
Figure 15:
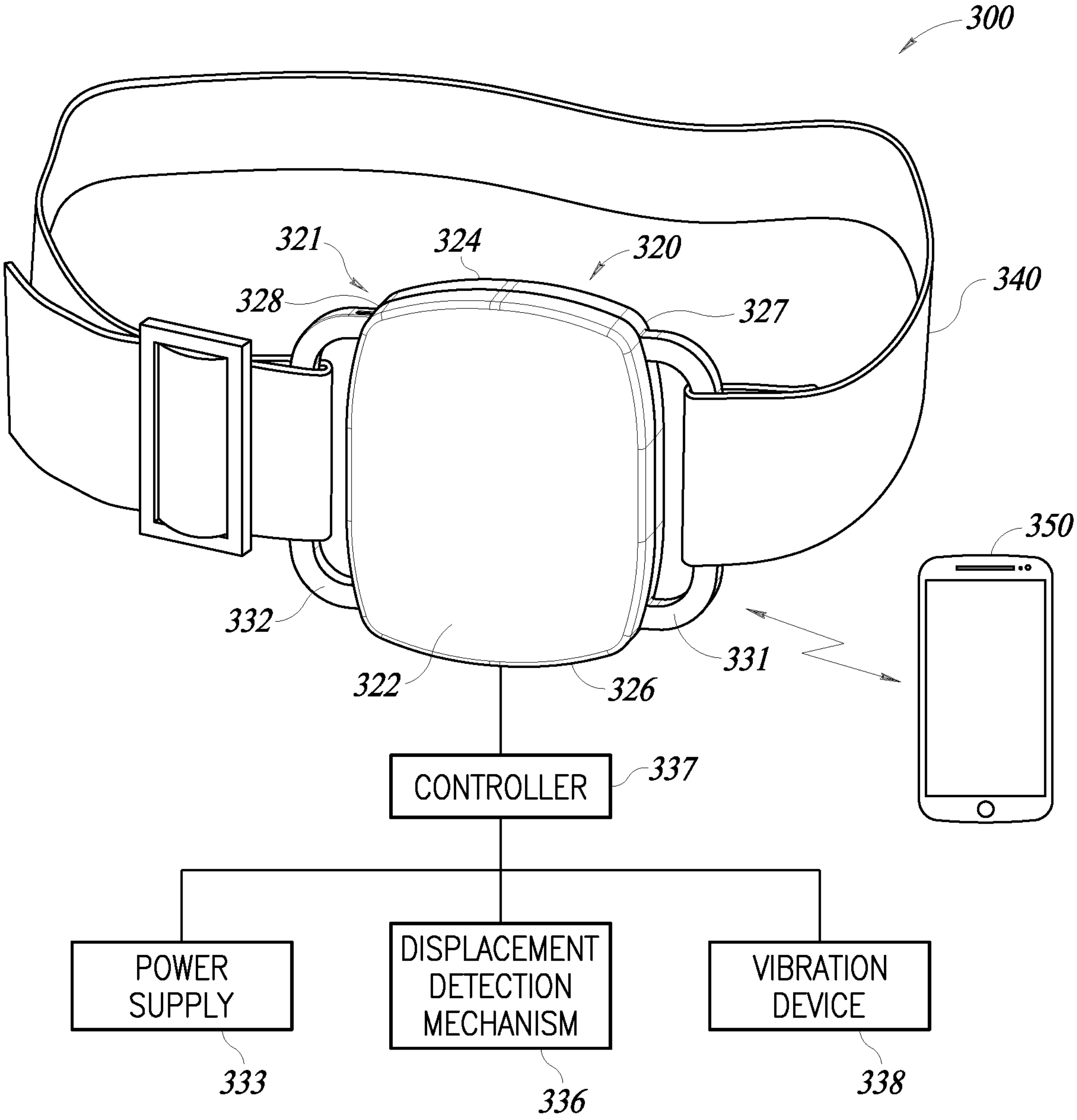
FIG. 15 is a combined pictorial view and block diagram of abdominal biofeedback apparatus including a biofeedback device and a strap in accordance with another aspect of the present invention.
Figure 16:
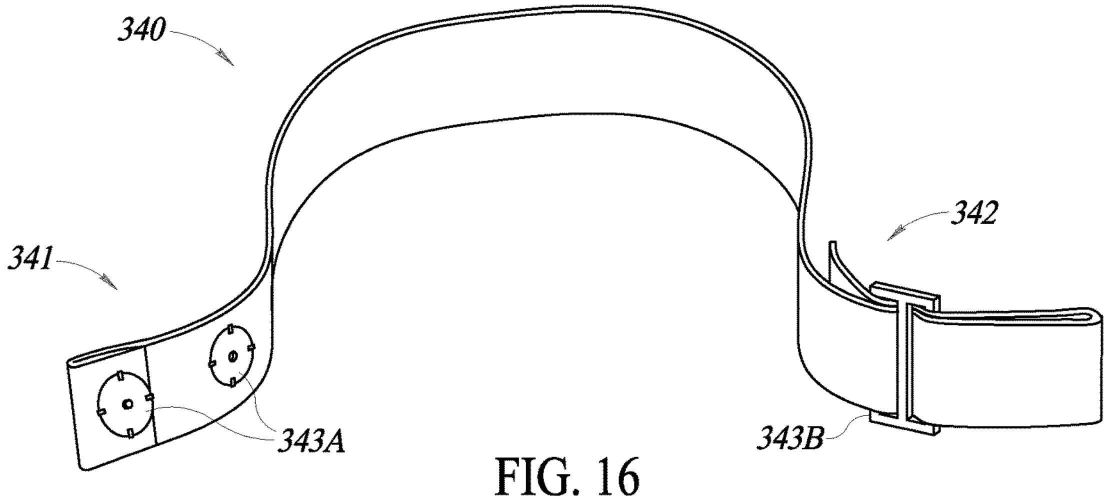
FIG. 16 is a pictorial view of the strap.
Figure 17:
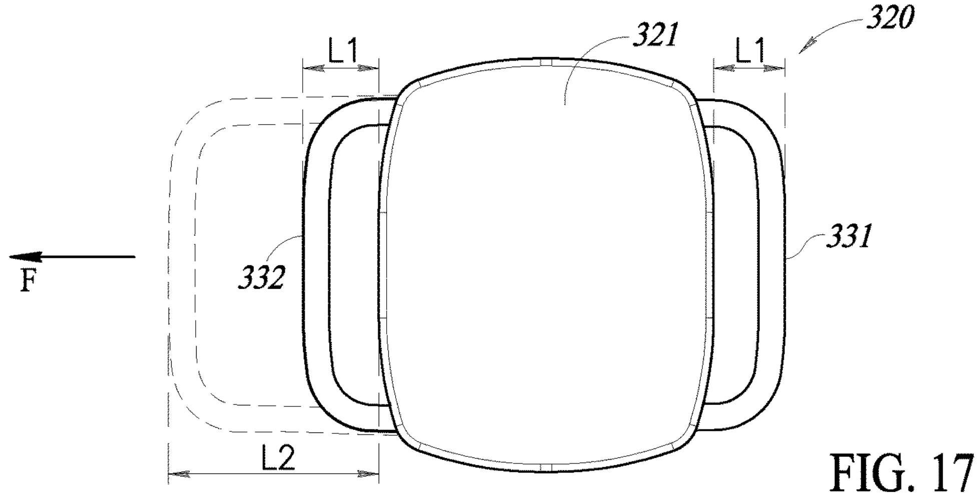
FIG. 17 is a front elevation view of the biofeedback device.
Figure 18:
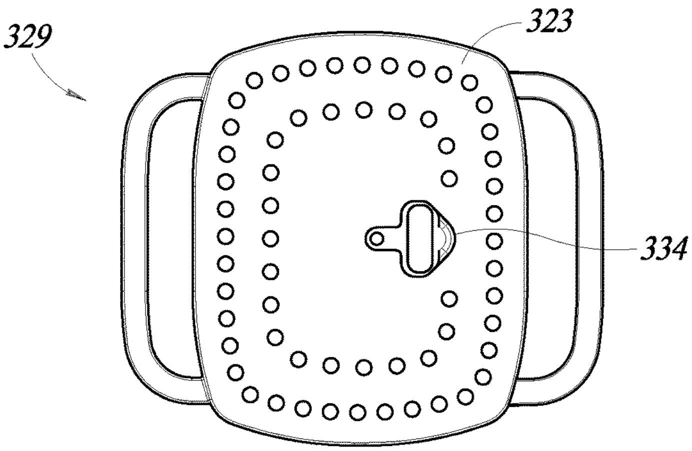
FIG. 18 is a rear elevation view of the biofeedback device.

FIG. 14 shows that in the case of a donor container 200 having a spray dispenser constituting a dispenser 202, a user inverts the product dispenser 100B and removes the refilling module cap 109 to expose the funnel 120. The funnel 120's funnel centerline 121 assumes its unflexed arcuate orientation subtending its acute angle with the housing centerline 102. A righthand user typically holds the inverted product dispenser 100B in his left hand and holds a donor container 200 in his righthand such that the product dispenser 100B and the donor container 200 subtend an included acute angle therebetween and urges the donor container's spray dispenser 202 against the product dispenser's funnel rim 124. Thereupon, the user places his forefinger on the forefinger support 127 and repeatedly depresses the donor container's spray dispenser 202 for transferring liquid product to the product dispenser 100B. The funnel 120's unflexed arcuate orientation and its greater pliability particularly towards its funnel rim 124 compared to the funnel 107 affords more ergonomical refilling the product dispenser 100B than the product dispenser 100A in terms of less force having to be applied by a user to prevent spillage between the donor container 200 and the product dispenser 100B during refilling. Moreover, the product dispenser 100B affords greater flexibility of its angle relative to a donor container 200 such that a user can use a single hand to refill the product dispenser 100B. Also, the product dispenser 100B affords refilling from a wider range of different sizes and shapes of donor container's dispensers 202 than the product dispenser 100A.

After refilling the product dispenser 100B, the user holds the refilling module cap 109 and initially slidingly inserts the plug 111 into the funnel 120 and subsequently manipulates the refilling module cap 109 to flex the funnel 120 towards its flexed orientation co-directional the housing centerline 102 before securing the refilling module cap 109 on the refilling module 104. Manipulating the refilling module cap 109 to flex the funnel 120 causes the plug 111 to tightly seal thereagainst. Thereafter, the user uprights the product dispenser 100B and removes the dispensing module cap 108 ready for dispensing liquid product.

Section 3: Abdominal Biofeedback Apparatus

FIG. 15 to FIG. 18 show abdominal biofeedback apparatus 300 for strapping around a user's waist for assisting the user to strengthen his abdominal muscles and/or core muscles. The abdominal biofeedback apparatus 300 includes a biofeedback device 320 and a strap 340 selectively attachable to the biofeedback device 320 and removable therefrom. The abdominal biofeedback apparatus 300 can be optionally used with a smartphone app 350 for logging user information, issuing user alerts, training programs, and the like. User information can include, for example, usage information, user alert information, and the like. The biofeedback device 320 and the smartphone app 350 can employ conventional wireless protocols for pairing and transmission.

The strap 340 includes opposite free strap ends 341 and 342 each provided with a securing device 343 for being securely secured to the biofeedback device 320. Suitable securing devices include inter alia a snap fit fastener, a slide buckle, a hook and loop fastener, and the like. In the present example, the strap end 341 is fitted with a snap fit fastener 343A and the strap end 342 is provided with a slide buckle 343B. The strap 340 is preferably made from machine washable fabric material. Fabric materials can include synthetic fabric materials, natural fabric materials, and mixed synthetic fabric and natural fabric materials. Suitable synthetic fabric materials include, for example, nylon, polyester, and the like. Suitable natural fabric materials can include, for example, cotton, hemp, and the like.

The biofeedback device 320 includes a generally planar housing 321 having a front face 322 facing away from a user's body, a rear face 323 facing towards a user's body, a top face 324, a bottom face 326, a left side face 327 and a right side face 328 from the point of view of a user using the abdominal biofeedback apparatus 300. The rear face 323 preferably includes an anti-slip pattern 329 for affording improved contact with a user's body. The anti-slip pattern 329 can be in the form of rounded protrusions, and the like. The anti-slip pattern 329 can be integrally manufactured with the housing 321, glued on the housing 321, and the like. The biofeedback device 320 is preferably water resistant such that it can washed and cleaned.

The biofeedback device 320 includes a rigid strap ring 331 extending from the left side face 327 and a reciprocal strap ring 332 extending from the right side face 328. The strap end 341 is securely attached to the rigid strap ring 331 and the strap end 342 is securely attached to the reciprocal strap ring 332 adjacent the biofeedback device 320 such that they are located on a user's abdomen for enabling convenient user adjustment of the abdominal biofeedback apparatus 300 while it is being continuously worn.

The reciprocal strap ring 332 is biased toward a retracted position relative to the housing 321 and linearly slidingly displaceable to an extended position (shown in dashed line in FIG. 17) on application of an extension force F in a direction away from the right side face 328. The reciprocal strap ring 332 extends to a length L2 from the right side face 328 between its retracted position and its extended position. The reciprocal strap ring 332's reciprocal stroke is between about 1 cm and about 5 cm.

The biofeedback device 320 includes the following components:

A power supply 333 in the form of a rechargeable battery, a replaceable battery, a solar panel, and the like. A rechargeable battery can be recharged by conventional means, a USB adapter, induction charging, and the like. The housing 321 can include a charging port 334. A replaceable battery can include a button battery, the like.

A displacement detection mechanism 336 in operative association with the reciprocal strap ring 332 for detecting its linear sliding displacements from its biased retracted position towards its extended position. Suitable displacement detection mechanisms 336 include inter alia a commercially available linear load cell, and the like.

A PCB controller 337 for issuing user alerts on detection of displacement of the reciprocal strap ring 332 from its retracted position greater than a predetermined minimum displacement. The predetermined minimum displacement may be zero displacement. Alternatively, the predetermined minimum displacement may be, say, 5 mm, to avoid slight bodily movements causing user alerts. The biofeedback device 320 can optionally include a vibration device 338 similar to a smartphone for issuing user alerts. Alternatively, the controller 337 can issue user alerts to the smartphone app 350, for example, noise alerts, and the like.

User alerts can be optionally proportional to the reciprocal strap ring 332's displacement from its retracted position. A user alert's intensity typically increases with the reciprocal strap ring 332's displacement from its retracted position. User alerts can be proportional to the reciprocal strap ring 32's duration from its retracted position. A user alert's intensity typically increases with reciprocal strap ring 332's duration from its retracted position.

The smartphone app 350 can be optionally used to set up the biofeedback device 20 in terms of predetermined minimum displacement, and intensity of user alerts as a function of a displacement and/or duration of a reciprocal strap belt from its retracted position.

The use of the abdominal biofeedback apparatus 300 in now described.

A user attaches the strap to the biofeedback device and adjusts the strap's length such that he can snugly strap the abdominal biofeedback apparatus around his waist after he has comfortably tensed his abdominal muscles. The user typically places the biofeedback device at his abdomen's front navel or one of its sides. Depending on the securing devices, the user can use one or both securing devices to conveniently adjust the strap's length around his waist while continuously wearing the abdominal biofeedback apparatus by virtue of the securing devices being adjacent to the biofeedback device.

For as long as the user continuously tenses his abdominal muscles, the abdominal biofeedback apparatus does not issue a user alert. On instances the user relaxes his abdominal muscles, the strap extends the reciprocal strap ring from the biofeedback device. If the extension is less than or equal to the reciprocal strap ring's predetermined minimum displacement, the abdominal biofeedback apparatus does not issue a user alert. If the extension is greater than the reciprocal strap ring's predetermined minimum displacement, then the abdominal biofeedback apparatus issues a user alert to remind the user to tense his abdominal and core muscles. After prolonged use, the user can remove the strap for washing same and replace the strap for continued use.

While the invention has been described with respect to a limited number of embodiments, it will be appreciated that many variations, modifications, and other applications of the invention can be made within the scope of the appended claims.

The invention claimed is:

1. A product dispenser refillable from a donor container containing liquid product and including a dispenser for dispensing liquid product, the product dispenser comprising:

a) a housing having a housing centerline and configured for receiving and storing liquid product, the housing having:

i) a dispensing module including a dispenser mechanism for dispensing liquid product from the product dispenser, and ii) a refilling module spaced apart from the dispensing module and including a funnel through which liquid product is filled into the housing from the donor container; and b) a refilling module cap for secure mounting on the refilling module and dismounting therefrom for corresponding sealing the funnel and enabling the housing to be filled with liquid product from the donor container, the refilling module cap having a plug for sliding sealing insertion into the funnel and removal therefrom, the funnel being made from pliable plastic material enabling repeated reciprocation between an unflexed arcuate orientation away from the housing centerline and a flexed orientation co-directional with the housing centerline, such that for refilling liquid product from the donor container to the product dispenser, on dismounting the refilling module cap from the refilling module, the funnel assumes its unflexed arcuate orientation, and after refilling, a user holds the refilling module cap to initially slidingly insert the plug into the funnel and subsequently manipulates the refilling module cap to flex the funnel towards its flexed orientation co-directional the housing centerline before securing the refilling module cap on the refilling module.

2. The product dispenser according to claim 1 wherein the funnel has a stepped construction including a trailing funnel section and a leading funnel section having a funnel rim bounding a funnel opening, the leading funnel section having a reduced thickness compared to the trailing funnel section for intimate sealing contact with the donor container's dispenser.

3. The product dispenser according to claim 1 wherein the funnel has a funnel rim bounding a funnel opening and the funnel rim includes a forefinger support protrusion for supporting a user's forefinger during refilling the product dispenser from a donor container including a spray dispenser.

4. The product dispenser according to claim 1 wherein the funnel includes a one-way valve for preventing spillage.

5. The product dispenser according to claim 1 wherein the housing includes a window for viewing its stored volume of liquid product.

* * * * *